United States Patent [19]

O'Brien et al.

[11] Patent Number: 5,219,417
[45] Date of Patent: Jun. 15, 1993

[54] COMPACT DISC STORAGE PACKAGE

[75] Inventors: Patrick J. O'Brien, Hackensack; Herbert Friedman, Fort Lee, both of N.J.

[73] Assignee: Ivy Hill Corporation, New York, N.Y.

[21] Appl. No.: 807,477

[22] Filed: Dec. 12, 1991

Related U.S. Application Data

[63] Continuation-in-part of Ser. No. 698,201, May 10, 1991.

[51] Int. Cl.⁵ .............................................. B65D 85/57
[52] U.S. Cl. .................................. 206/312; 206/313; 206/444
[58] Field of Search ............................. 206/309–313, 206/444; 312/9–12

[56] References Cited

U.S. PATENT DOCUMENTS

| | | |
|---|---|---|
| 3,487,919 | 1/1970 | Elliott et al. ................. 312/10 X |
| 4,176,744 | 12/1979 | Borzak . |
| 4,640,413 | 2/1987 | Kaplan et al. . |
| 4,709,812 | 12/1987 | Kosterka . |
| 4,874,085 | 10/1989 | Grobecker et al. . |
| 4,905,831 | 3/1990 | Bagdis et al. . |
| 4,925,023 | 5/1990 | Goldblatt et al. . |

FOREIGN PATENT DOCUMENTS 2219573 12/1989 United Kingdom ............... 206/309

OTHER PUBLICATIONS

"Marketplace", Wall Street Journal, Jul./Aug. 1991.

Primary Examiner—Bryon P. Gehman
Attorney, Agent, or Firm—Amster, Rothstein & Ebenstein

[57] ABSTRACT

A storage package for compact discs and the like has a plurality of non-plastic panels including a pair of end panels and optionally at least one panel intermediate to and connecting the pair of end panels. The plurality of panels is movable between an open orientation enabling access to the contents of the package and a collapsed orientation for storage purposes, each of the panels having a pair of opposed lateral sidewalls, and the plurality of panels in the collapsed orientation defining at least one spine. A holder formed of plastic is disposed on one of the panels for receiving and maintaining a compact disc thereon. An end cap is disposed on one of the end panels, the end cap being adapted to releasbbly engage the holder when the plurality of panels is in the collapsed orientation, thereby to preclude accidental movement of the plurality of panels out of the collapsed orientation.

23 Claims, 7 Drawing Sheets

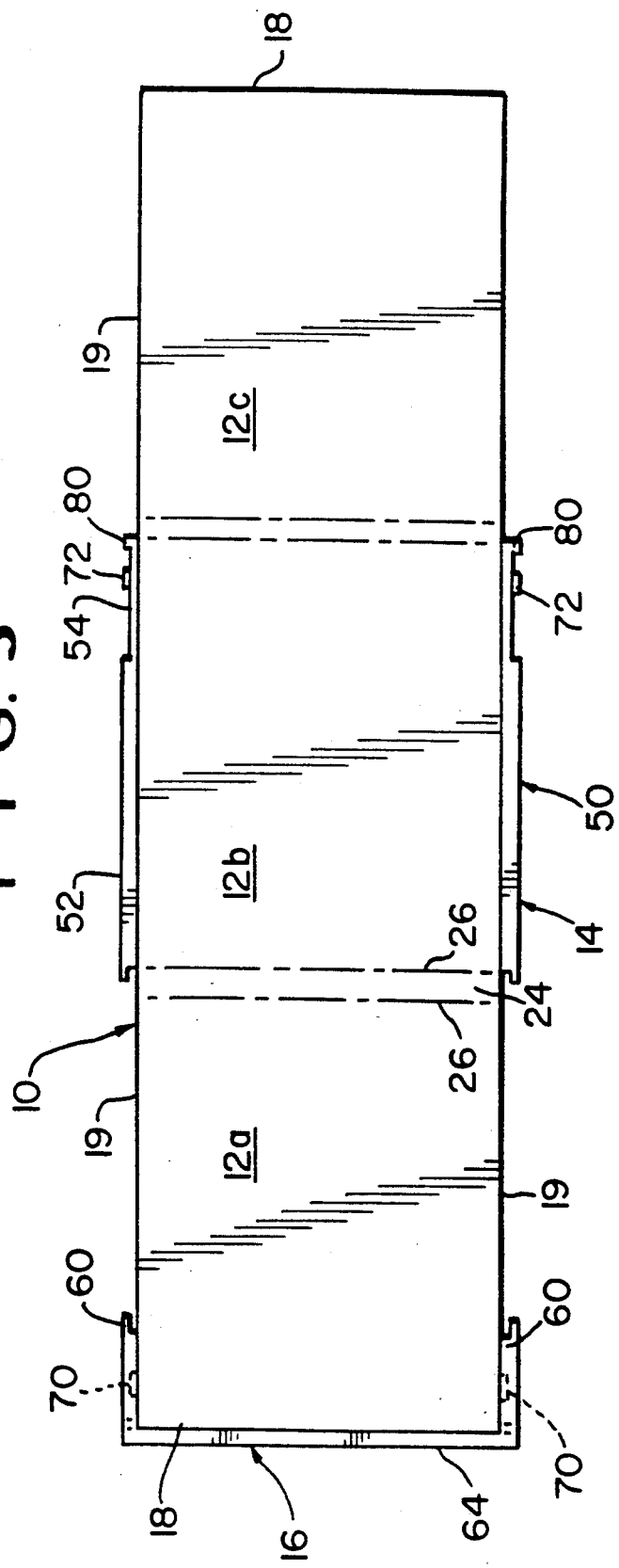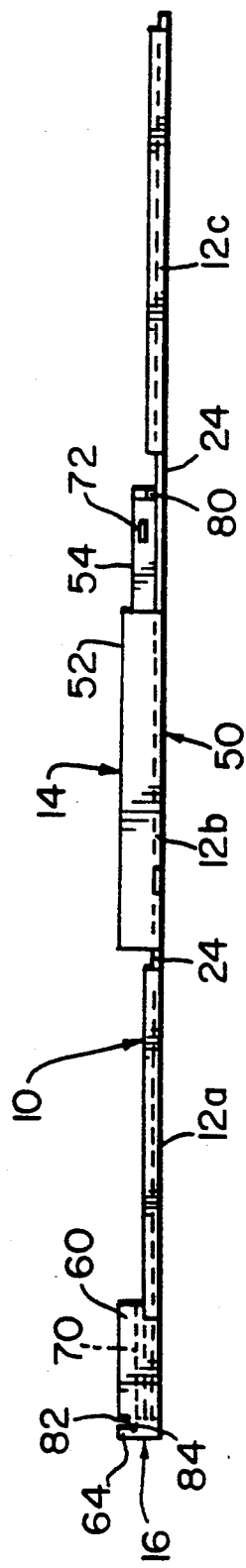

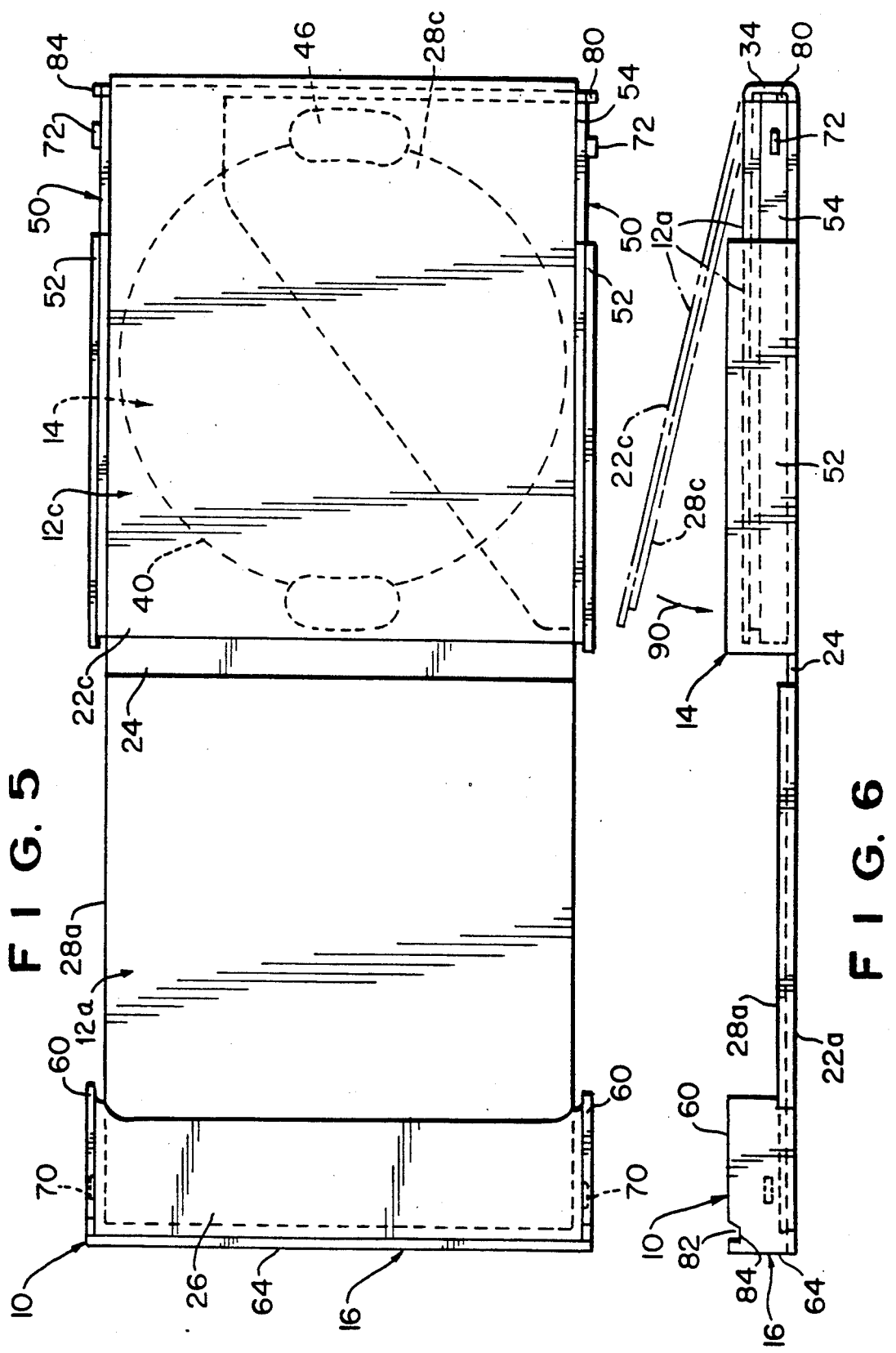

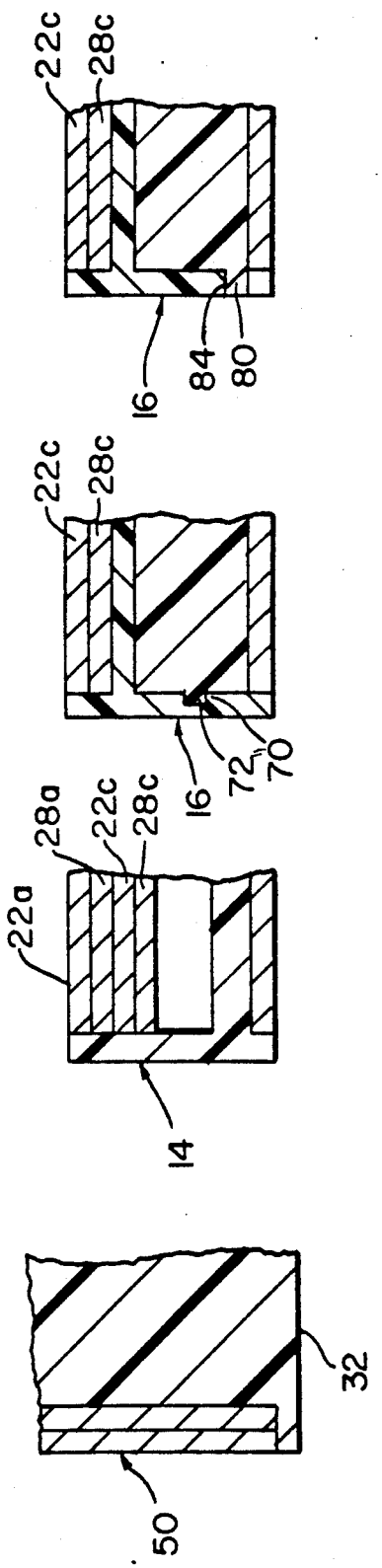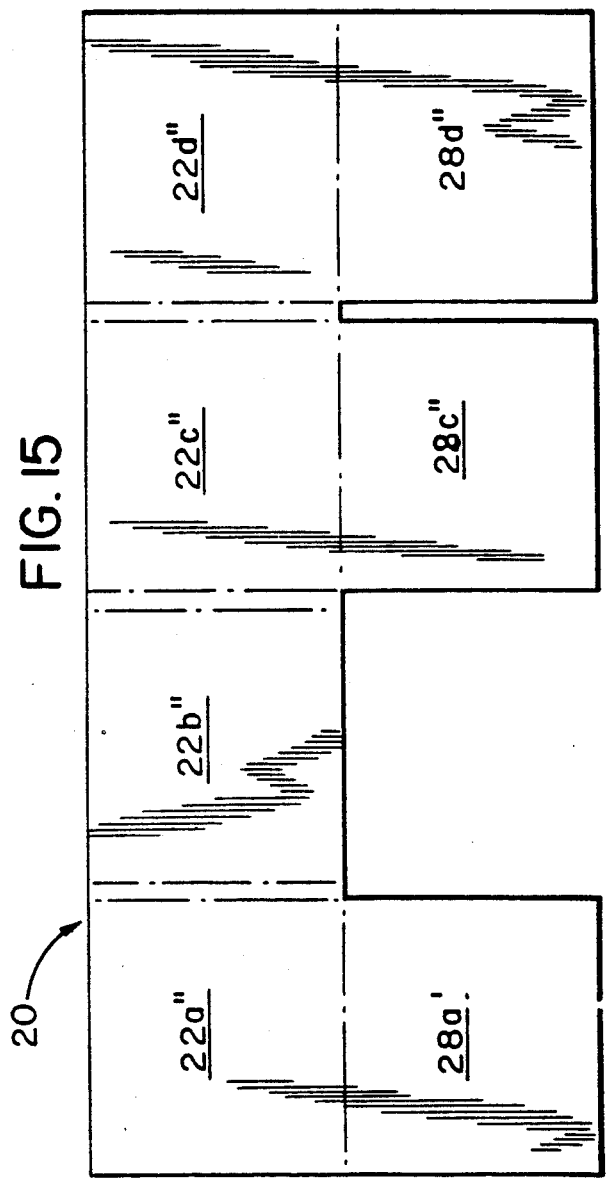

COMPACT DISC STORAGE PACKAGE

CROSS-REFERENCE TO RELATED APPLICATION

The present application is a continuation-in-part of U.S. Pat. Application Ser. No. 07/698,201, filed May 10, 1991.

BACKGROUND OF THE INVENTION

The present invention relates to packaging and, more particularly, to packaging for a compact disc or the like.

U.S. Pat. No. 4,709,812 discloses packaging for a compact disc (CD) or the like which is formed of a plastic CD holder for releasable receiving and holding a CD and a plurality of interconnected non-plastic (typically paperboard) panels which are moveable between an open position where the CD holder and any compact disc thereon are accessible and a collapsed orientation for storage wherein the various panels overlap and protect the CD. The packaging uses less plastic than the well known jewel box (which is formulated almost entirely in plastic), and the plastic which it does use, as well as the paperboard, may be both recycled and recyclable. Nonetheless this packaging has not proven to be entirely satisfactory in use.

As no provision is made for securing the packaging in its collapsed orientation for storage, the packaging can accidentally become opened (i.e., the plurality of panels moved to its open orientation), thus exposing the compact disc to dirt, fingerprints, and the like. Also, the holder has a face which is approximately the same size as, or even smaller than, the paperboard panels so that the edges of the latter are coextensive with or even project outwardly from the holder with the result that they are susceptible to dog-earing, fraying crushing and like disfigurement due to handling. Further, although the spine of the packaging in its collapsed orientation typically contains important identifying information (such as the nature of the matter recorded on the CD) intended to be viewable when the packaging is stored appropriately against like CD packages with only the package edges visible, no protection is provided for the spine so that, with continued handling of the packaging, the spine is subject to deterioration, and with it the identifying information thereon. (This is a special problem since in certain storage devices only the spine is exposed to the viewer and, therefore, the viewer has to forcibly grasp the spine and utilize it in order to separate the desired packaging from the remainder of the packaging in the same storage device.) Where the packaging contains a secondary spine opposite the primary spine, the secondary spine is also subject to dog-earing and the like even though this is of lesser importance than in the case of the primary spine since the secondary spine rarely contains identifying information of importance to the user.

Accordingly, it is an object of the present invention to provide packaging for a compact disc or the like which includes means for maintaining the packaging in its closed orientation.

Another object is to provide such packaging which includes means to prevent dog-earing, fraying or like destruction of the spine.

A further object is to provide such packaging which includes means to prevent dog-earing, fraying or like destruction of the exposed sidewall edges of the paperboard panels.

It is also an object of the present invention to provide such packaging which is ecologically sound, being composed substantially of recycled and/or recyclable plastic and paperboard.

It is another object to provide such packaging which is simple and economical to manufacture.

SUMMARY OF THE INVENTION

It has now been found that the above and related objects of the present invention are obtained in packaging for a compact disc or the like comprising a plurality of non-plastic panels including a pair of end panels and optionally at least one panel intermediate to and connecting the pair of end panels. The plurality of panels is movable between an open orientation enabling access to the contents of the package and a collapsed orientation for storage purposes. Each of the panels has a pair of opposed lateral sidewalls, and the plurality of panels in the collapsed orientation defines at least one spine. A holder formed of plastic is disposed on one of the panels for receiving and maintaining a compact disc thereon. An end cap formed of plastic is disposed on one of the end panels, the end cap being adapted to releasably engage the holder when the plurality of panels is in the collapsed orientation, thereby to preclude accidental movement of the plurality of panels out of the collapsed orientation. Preferably the plurality of panels is formed of paperboard.

In a preferred embodiment, the plurality of panels in the open orientation has no panel overlying the panel on which the holder is disposed, thereby enabling access to the holder and any compact disc thereon, and in the collapsed orientation has each of the panels overlapping one another, thereby to provide a compact package for storage. The holder is disposed on a panel adjacent the one end panel on which the end cap is disposed. When the plurality of panels includes at least one intermediate panel, the holder is disposed on one of the intermediate panels which is immediately adjacent the one end panel. When the plurality of panels is in the collapsed orientation, the other of the end panels and any other of the intermediate panels are disposed intermediate the one end panel and the one intermediate panel.

Typically in the preferred embodiment, the end cap is generally U-shaped and has a pair of upstanding opposed lateral sidewalls defining engaging means and a bight or shank portion connecting the same; and the holder has a generally planar and generally rectangular body and a pair of opposed lateral sidewalls defining engaging means adapted to engage cooperatively with the end cap engaging means.

When the plurality of panels is in the collapsed orientation, the end cap bight portion extends over one spine of the package to protect the same, the end cap bight portion extending over the spine being transparent to enable viewing of any material printed on the spine. The end cap extends upwardly from the panel on which it is disposed to overlap the holder when the plurality of panels is in the collapsed orientation, and also extends downwardly from the panel on which it is disposed sufficiently to overlap and protect adjacent edges thereof. Thus, the end cap extends upwardly and downwardly sufficiently to overlap and protect adjacent portions of the opposed lateral sidewalls and one end of the plurality of panels when the plurality of panels is in the collapsed orientation.

The holder sidewalls extend upwardly above the plane of the holder body for a major length thereof (the holder engaging means being disposed on the remainder of the length thereof) and downwardly below the plane of the holder body for substantially the entire length thereof. More particularly, the holder sidewalls extend downwardly below the plane of the holder body at least the thickness of the panel on which the holder is disposed and, for the major length thereof, upwardly from the plane of the holder body at least the thickness of the remainder of the panels when the plurality of panels is in the collapsed orientation, thereby to overlap and protect the sidewalls of the plurality of panels in the collapsed orientation. Thus, the holder sidewalls extend upwardly and downwardly relative to the plane of the holder body to cover both the sidewalls of the panel on which it is disposed and, in cooperation with the sidewalls of the end cap, the sidewalls of the other of the panels when the plurality of panels is in the collapsed orientation.

Additionally, when the plurality of panels is in the open orientation, the holder sidewalls extend beyond the holder body toward the one end panel on which the end cap is disposed sufficiently that, when the plurality of panels is in the collapsed orientation, the holder sidewalls overlap and protect the sidewalls of the spine not covered by the end cap.

Preferably each of the holder and the end cap defines abutment means adapted to abut one another and limit relative movement in a given direction, thereby to limit the pressure exertable by the end cap on the holder body. The abutment means are optimally on the sidewalls of the holder and the end cap.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 3 is a bottom plan view thereof;

FIG. 4 is a side elevational view thereof;

FIG. 5 is a top plan view thereof, to a slightly enlarged scale, in an intermediate orientation between the open and closed orientations;

FIG. 6 is a side elevational view similar to FIG. 5, but with a panel also being illustrated in phantom line in an intermediate position partially, but not fully, folded over;

FIGS. 11, 12, 13 and 14 are sectional views, to an enlarged scale, taken along the lines 11—11, 12—12, 13—13 and 14—14 respectively, of FIG. 8; and FIG. 15 is a top plan view of a blank useful for the paperboard portion of packaging for a four-panel embodiment of the packaging according to the present invention.

DETAILED DESCRIPTION OF THE PREFERRED EMBODIMENTS

Figure 1:
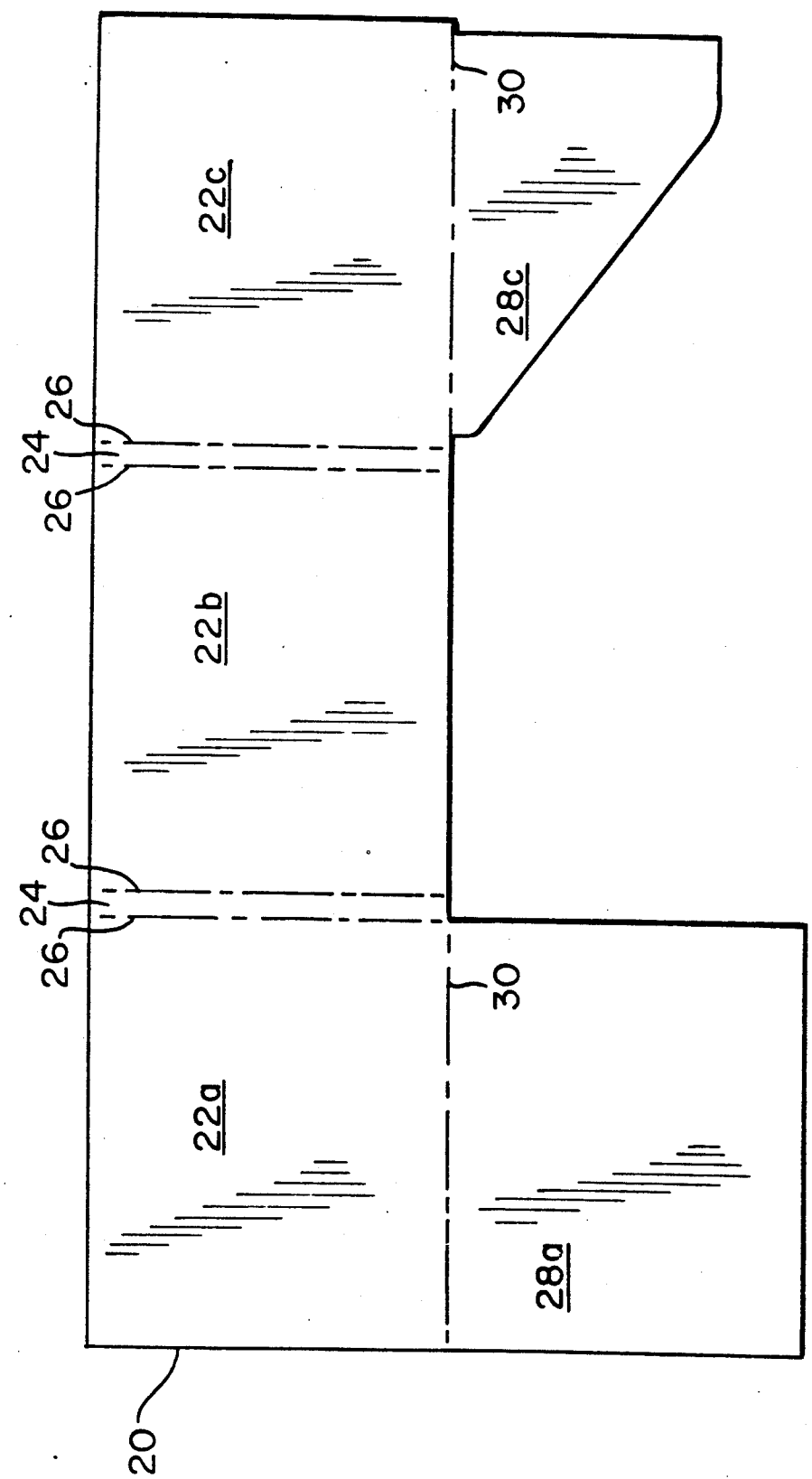
FIG. 1 is a top plan view of a blank useful for the paperboard portion of packaging for a compact disc or the like according to the present invention.

The present invention is a storage package for compact discs and the like. Encompassed by the term "computer discs and the like" are CD-ROM's, diskettes, and the like, which may be blank or prerecorded and may contain or be adapted to contain music, words, images, binary data, and the like as well as combinations thereof.

Referring now to the drawing, and in particular to FIGS. 2–8 thereof, therein illustrated is a storage pack according to the present invention, generally designated by the reference numeral 10. The storage pack 10 is composed of a plurality of non-plastic panels generally designated 12, a holder formed of plastic generally designated 14, and an end cap formed of plastic generally designated 16. Unlike the all-plastic jewel box conventionally used for the storage of CD's, the packaging of the present invention is to a large degree formed of the non-plastic panels 12, the latter preferably being formed of paperboard which readily decomposes under landfill conditions and is thus more ecologically acceptable then plastic. Moreover, both the paperboard and plastic components of the present invention may be made from recycled materials and are themselves recyclable, thereby rendering the package not only ecologically but also economically sound.

While FIGS. 2–8 illustrate a three-panel embodiment of a package according to the present invention, similar packages utilizing the principle of the present invention may be formed from fewer panels (see the two-panel embodiment of FIGS. 9 and 10) or more panels (see the five-panel embodiment of FIG. 13, by way of example).

Referring now to FIG. 1 in particular, the plurality of non-plastic panels 12 may be formed from a prescored, preprinted unitary blank or sheet generally designated 20. The blank 20 is preferably divided into rows. The first row 22 has a number of rectangular sections equal to the number of panels in the plurality (here, three): namely, the sections 22a, 22b and 22c. The three sections 22a, 22b, 22c in the first row 22 are separated from each other by strips 24 having a width which is small relative to the width of the sections, the strips being bounded by foldlines 26. As will become apparent hereinafter, the width of the strips 24 will be determined by the need of the strip to accommodate the gap between adjacent rectangular sections 22 when the plurality of panels 12 is disposed in a collapsed orientation for storage purposes, with each of the panels 12 being in overlapping relationship.

For reasons of economy, the blank 20 is typically multi-color printed on only one surface thereof, although it is desirable for aesthetic reasons that both major surfaces of the panels 12 which will be exposed to view be multi-color printed. The opposed surface of the blank 20 is typically either left in its original color or printed with only a single color. Accordingly, the blank 20 preferably also has a second row 28 composed of one or more unconnected rectangular sections such as section 28a. Accordingly, when rectangular sections 22a and 28a are both multi-color printed on only one surface, one is then folded over a foldline 30 therebetween so as to be in overlapping relationship and define a panel (here panel 12a of FIG. 2) with the multi-color printed surfaces of the sections exposed and the non-multi-color printed surfaces glued together and thus hidden from view.

Preferably, for a variety of reasons, there is no section in the second row 28 adjacent the section 22b, which is adapted to receive the holder 14. First, since section panel 22b will have one surface totally covered by the holder 14, there is no aesthetic reason for having an adjacent section in the row 28. Second, the non-multi-color-printed or non-coated surface of section 22b enables the holder 14 to be better secured thereto than it would be to a multi-color-printed surface. Third, the missing section is not necessary to impart additional strength and rigidity to the section 22b (as it would if the missing section and section 22b were folded over and glued together) since section 22b is subsequently strengthened and rigidified by the presence thereon of the holder 14. Fourth, the missing section would unnecessarily increase the thickness of the entire package in its collapsed orientation, this being a particular problem where the package is intended to occupy the same volume as a conventional jewel box (for example, to enable the use of existing storage facilities for conventional jewel-box CD packaging).

A rectangular section, similar to section 28a of the second row 28, may be placed in the second row adjacent the section 22c of the first row, with a foldline 30 being disposed therebetween. In this case the section 28c may be folded over the foldline 30 and glued to its adjacent section 22c in the same manner as section 28a is folded over and glued to adjacent section 22a to form a panel. However, as it is frequently desirable to place removable literature within the CD packaging (such as a booklet describing the prerecorded matter, the creation of the matter, the artist, instructions for use, or the like), the section 28c may be glued to the section 22c only at the two lateral ends thereof (the end of section 22c adjacent section 22b and the free end thereof) so as to define with section 28c a panel 12c (see FIG. 2) having an open-top pocket into which such literature or booklet may be stored. To facilitate access to the pocket, this section 28c is preferably somewhat in the configuration of a right-angle trapezoid rather than a rectangle, with the free long end of section 28c being glued to the free end of section 22c and preferably the free short end of section 28c being glued to the end of section 22c adjacent section 22b.

Figure 2:
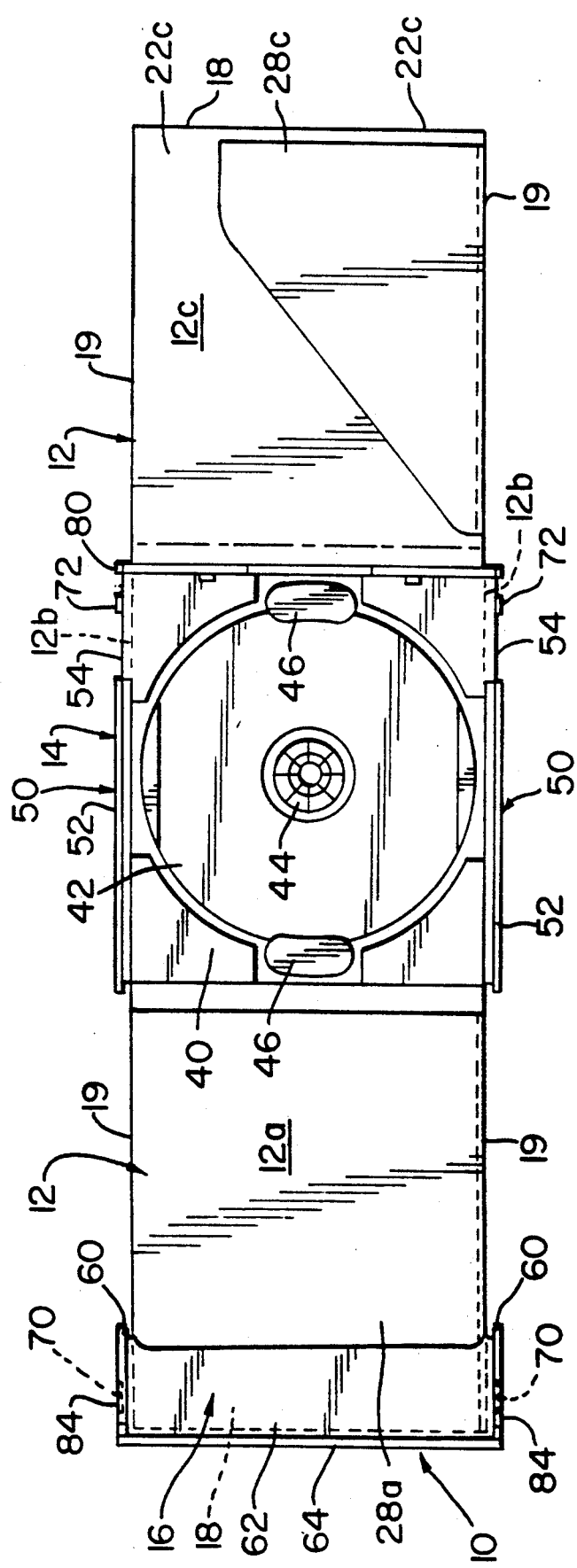
FIG. 2 is top plan view of the packaging according to the present invention, the packaging being illustrated in the open orientation.

Referring now to FIG. 2, the plurality of non-plastic panels 12 formed from the blank 20 (after folding and gluing of the sections of the second row 28 to adjacent sections of the first row 22) include a pair of end panels 12a and 12c and optionally (as illustrated in FIG. 3) at least one panel 12b intermediate to and connecting the pair of end panels 12a, 12c. The plurality of non-plastic panels 12 further defines a pair of opposed free ends 18 and a pair of opposed lateral sidewalls 19. Panel 12b is, of course, composed only of section 22b.

Referring now to FIGS. 5–8 as well, the plurality of panels 12 is movable between an open orientation enabling access to the contents of the package (see FIGS. 2–4), through an intermediate orientation (see FIGS. 5–6) wherein some of the panels (e.g., panels 12b, 12c as illustrated) are overlapping, and a collapsed orientation for storage purposes (see FIGS. 7–8) wherein all of the panels 12a, 12b, 12c are overlapping. In other words, in the open orientation there is no panel overlying the panel 12b on which the holder 14 is disposed, thereby enabling access to the holder 14 and any compact disc thereon, and in the collapsed orientation each of the panels 12a, 12b, 12c overlaps one another, thereby to provide a compact package for storage. The plurality of panels 12 in the collapsed orientation defines a pair of opposed spines 32, 34 for the package (see FIG. 8), a first spine 32 composed primarily of the fold 24 intermediate panels 12a, 12b and a second spine 34 at the opposite end formed by the fold 24 intermediate panels 22b, 22c and the free end of panel 12a.

Referring now to FIGS. 2–4 in particular, the holder 14 preferably comprises an injection molded plastic element which differs in particular respects from the holder found in the conventional prior art jewel box. The holder 14 is disposed on the panel 12 adjacent the end panel on which the end cap 16 is disposed (here, end panel 12a) and, where there is at least one intermediate panel (here, intermediate panel 22b), the holder is disposed on one of the intermediate panels 22b which is immediately adjacent the one end panel 22a t which the end cap 16 is secured. When the plurality of panels 12 is in the collapsed orientation illustrated in FIGS. 7 and 8, the other end panel 12c and any other intermediate panels (not present in the three-panel embodiment) are disposed intermediate the one end panel 12a bearing the end cap 16, and the one intermediate panel 12b bearing the holder 14.

In its conventional aspects, the holder 14 has a generally planar rectangular body 40 defining a recess 42 on the exposed surface thereof configured and dimensioned to receive the centrally apertured CD (which is typically approximately 4.7 inches in outer diameter). The depth of the recess 42 is sufficient to ensure that the upper surface of the CD does not extend above the surface of the holder body 40 about the recess 42. A retaining element 44 is centrally disposed in recess 42, projecting upwardly therefrom, for retaining the CD in holder 14. Any of the conventional means for providing frictional engagement between the retaining element 44 and the inner circumference of the CD may be used— for example, upstanding pliable plastic tabs such as those used in the holder of the conventional jewel box to frictionally engage the inner circumference of the central hole of the CD and thus hold the CD in place. Additionally, a plurality of finger slots or recesses 46 (two being illustrated) are preferably provided so that the user can slide a finger below the edge of the CD while simultaneously exerting a slight downward force on the retaining means 44 to facilitate disengagement of the CD from retaining element 44 for removal of the CD from the recess 42. The finger recesses 46 are preferably disposed at opposite ends of a diameter of the holder recess 42 extending from end to end of holder 14, for example, parallel to the sidewalls 50 thereof.

Figure 8:
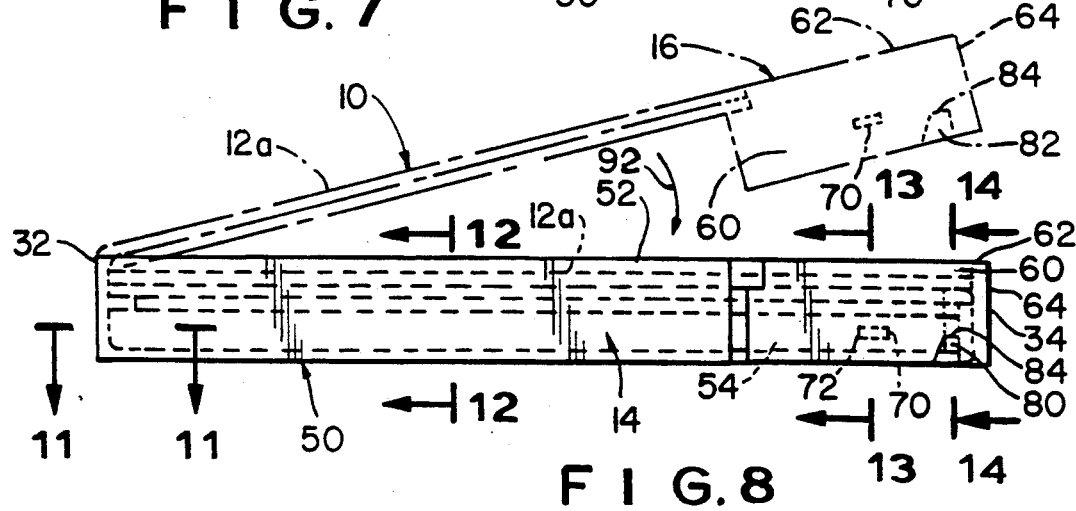
FIG. 8 is a side elevational view similar to FIG. 7, but with another panel being illustrated in phantom line in an intermediate position partially, but not fully, folded over.

The holder 14 further includes a pair of opposed lateral sidewalls generally designated 50, disposed slightly outwardly from the sidewalls 19 on panel 22b on which it is disposed. Each holder sidewall 50 includes a first portion 52 which extends substantially upwardly above the plane of the holder body 42 for a major length of the holder sidewall length (at least half thereof) and a second portion 54 which extends the remaining length 54 of the holder sidewall and does not extend appreciably above the surface of the holder body 40. Each second portion 54 defines, for reasons which will become apparent hereinafter, engaging means 72 adapted to releasably engage the end cap 16. Additionally, holder sidewalls 50 extend appreciably downwardly below the plane of the holder body 42 for substantially the entire length thereof. More particularly, as best illustrated in FIG. 8, the holder sidewalls 50 extend downwardly below the plane of the holder body 40 at least the thickness of the panel 12b on which the holder 14 is disposed and, for the major length thereof, upwardly from the plane of the holder body 40 at least the thickness of the remainder 12a, 12c of the panels when the plurality of panels 12 is in the collapsed orientation. Thus, the holder sidewalls 50 essentially overlap and protect the sidewalls 19 of the plurality of panels 12a, 12b, 12c in the collapsed orientation. As will become apparent hereinafter, the only portion of the panel sidewalls 19 not protected by the holder sidewalls 50 (because the raised holder sidewalls 52 extend only a major portion of the length thereof) are protected by the end cap 16. Accordingly, the holder sidewalls 50 extend upwardly and downwardly relative to the plane of the holder body 40 to cover both the sidewalls 19 of panel 12b on which it is disposed (at all times) and, in cooperation with the sidewalls of the end cap 16, the sidewalls 19 of the other of the panels 12a, 12c (when the plurality of panels 12 is in the collapsed orientation).

Figure 7:
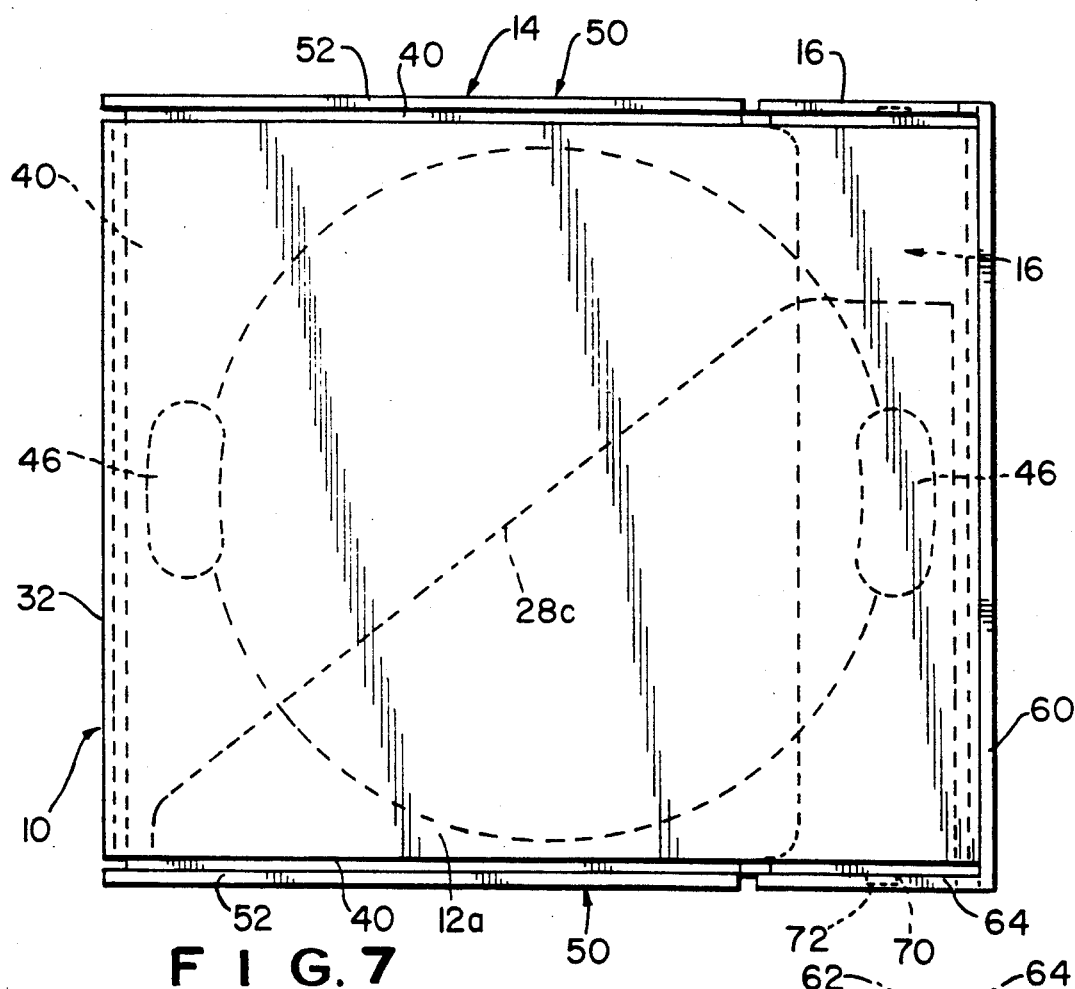
FIG. 7 is a top plan view of the packaging in the closed orientation.

Referring now to FIG. 2 in particular, when the plurality of panels 12 is in the open orientation, the holder sidewalls 50 extend toward the one end panel 12a on which the end cap 16 is disposed sufficiently that, when the plurality of panels 12 is in the collapsed orientation, as illustrated in FIGS. 7 and 8, holder sidewalls 50 overlap and protect the sidewalls of the spine 32 not covered by the end cap 16.

The end cap 16 is preferably comprised as an injection molded plastic element disposed on one of the end panels (here illustrated as panel 12a). The end cap 16 is adapted to releasably engage the holder 14 when the plurality of panels 12 is in the collapsed orientation, thereby to preclude accidental movement of the plurality of panels out of the collapsed orientation. End cap 16 is generally U-shaped and has a pair of upstanding opposed lateral sidewalls 60 and a bight portion 62 connecting the same. Bight portion 62 includes an upstanding end wall 64 configured and dimensioned to cover the spine 34 when the plurality of panels 12 is in the collapsed orientation, as illustrated in FIGS. 7 and 8. With the exception of the upstanding end wall 64 of the bight portion 62 of end cap 14, all of the plastic components of the present invention may be opaque or translucent and are typically black. The upstanding end wall 64 is, however, preferably transparent to enable viewing of any material printed or otherwise disposed on the spine 34, such as an identification of the compact disc disposed within the packaging 10. This permits the contents of the packaging to be determined even when both faces thereof are covered by like packaging, e.g., in a package storage device. Thus the end wall 64 is typically, although not necessarily, formed of virgin plastic to obtain the desired transparency.

The end cap sidewalls 60 and bight end wall 64 extend upwardly from the panel 12a on which the end cap 16 is disposed so as to overlap the holder 14 when the plurality of panels 12 is in the collapsed orientation. To this end, in that orientation the end cap sidewalls 60 are disposed in the same plane as the raised holder sidewall portions 52, both extending slightly beyond the panel sidewalls 19. The length of the end cap sidewalls 60 corresponds to the length of the non-raised sidewall portions 54 of the holder sidewalls 50 so that, when the plurality of panels 12 is in the collapsed orientation illustrated in FIGS. 7 and 8, the end cap sidewalls 60 cooperate with the holder sidewalls 50 to cover and protect the sidewalls 19 of the panels therebetween. Additionally, the end cap 16 also extends downwardly from panel 12a on which it is disposed sufficiently to overlap and protect the adjacent edges thereof—namely, the free end 18 and portions of the sidewalls 19 of panel 12a. Thus, the end cap extends upwardly and downwardly sufficiently to overlap and protect the adjacent portions of the opposed lateral sidewalls 19 of the panels 12 as well as the spine 34 when the plurality of panels 12 is in the collapsed orientation.

The end cap sidewalls 60 define engagement means 70 adapted to releasably engage cooperating engagement means 72 on holder sidewall portions 54. As illustrated, the end cap engaging means 70 is illustrated as an inwardly extending recess on the inner surface of each end cap sidewall 60, and the holder engaging means 72 is illustrated as an outwardly extending projection on the outer surface of an end cap sidewall portion 54, the recess 70 being adapted to receive and releasably maintain a projection 72 therein, thereby to preclude accidental opening of the package (that is, accidental movement of the plurality of panels 12 out of the collapsed orientation). Clearly, however, the recess 70 could be on the holder sidewall portion 54, and the projection 72 could be on the end cap sidewall portion 60; indeed, easily releasable engagement means other than a recess-and-projection system may be substituted.

In order to limit the pressure exerted by end cap 16 on holder body 40, and thus on any compact disc disposed within holder recess 42, holder 14 defines abutment means 80 in the form of a lug extending outwardly from each sidewall portion 54 thereof adjacent the end of the holder 14, and each sidewall 60 on the end cap 16 defines an abutment means 84 in the form of a recess 82. The holder abutment means 80 and the end cap abutment means 84 are adapted to abut one another when the plurality of panels 12 is in the collapsed orientation, thereby to limit relative movement of the holder 14 and end cap 16 relative to one another in a given direction.

To use the packaging in its open orientation, a compact disc is placed within the recess 42 of holder 14, on the retainer 44 thereof, and the packaging is then moved from its open orientation (illustrated in FIGS. 2 through 4) into its intermediate orientation (illustrated in FIGS. 5 and 6) by moving the panel 12c in the direction of arrow 90, and finally into its closed orientation (illustrated in FIGS. 7 and 8) by moving panel 12a in the direction of arrow 92. In this closed orientation, the holder sidewalls 50 in cooperation with the end cap 16 protect the panel sidewalls 19 and the spines 32, 34. The transparent end cap wall 64 protects the spine 34 covered by end cap 16 while permitting viewing thereof, and the ends of holder sidewalls 50 projecting laterally beyond the holder body portion 40 protect the edges of the spine 32 not covered by the end cap 16. The end cap 16 and the holder 14 cooperate to maintain the package in a collapsed orientation wherein the sidewalls of the various panels are fully protected against dogearing, fraying and the like.

Figure 9:
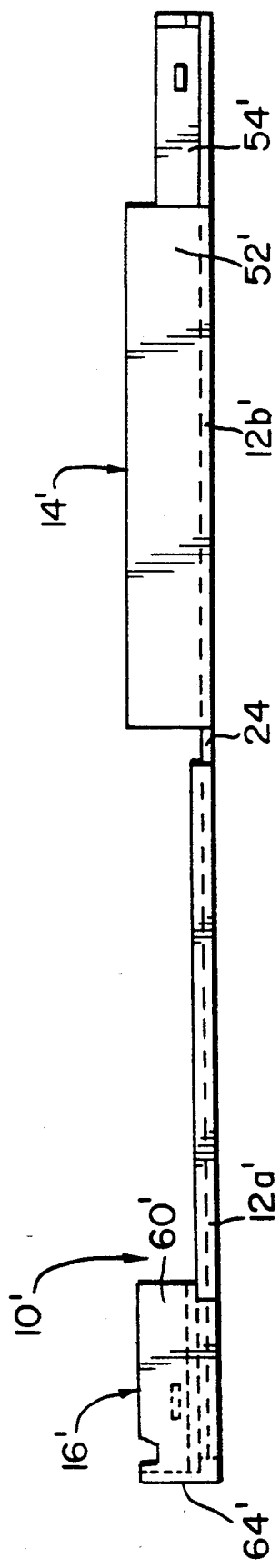
FIG. 9 is a side elevational view of a two-panel embodiment of the packaging of the present invention in the open orientation.
Figure 10:
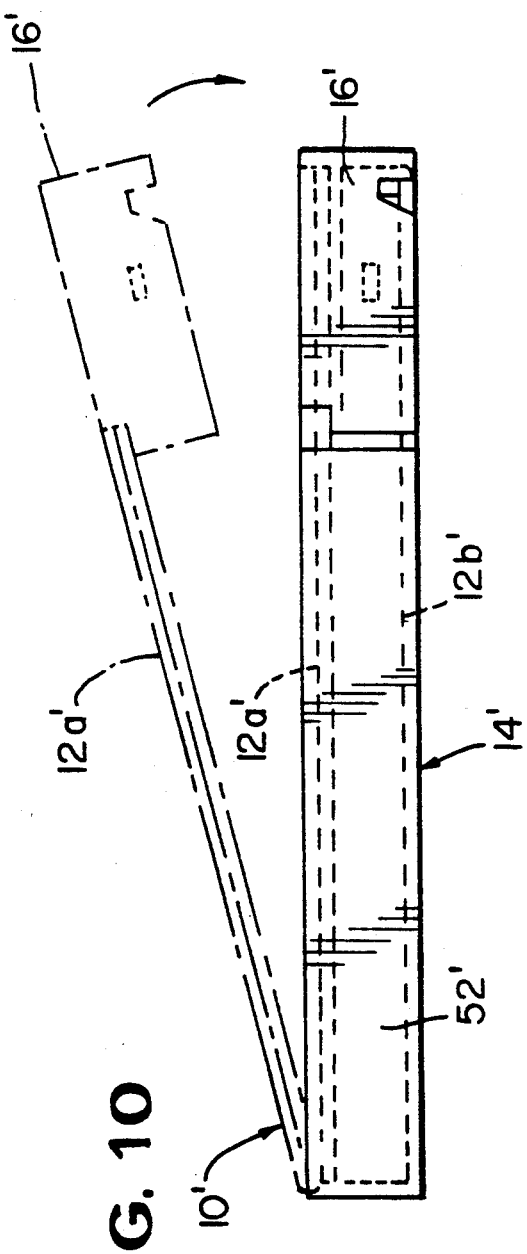
FIG. 10 is a side elevational view of the two-panel packaging in the closed orientation, but with one panel being shown in phantom line in an intermediate position partially, but not fully, folded over the other panel.

Referring now to FIGS. 9 and 10, therein illustrated is a second embodiment 10' of the present invention having only two panels 12a' and 12b'. Holder 14' is disposed on end panel 12b' and end cap 16' is disposed on end panel 12a'. In its functional aspects of the package 10' is identical to the threepanel package of embodiment 10 except that the width of the strip 24 may be slightly reduced since there is no panel akin to panel 12c to be accommodated between panels 12a' and 12b' and, for the same reason, the upstanding elements of end cap 16' (sidewalls 60' and end wall 64') and holder 14' (raised sidewalls 52') may be reduced in height.

Referring now to FIG. 15, therein illustrated is a third embodiment 20" of a blank used to form a four-panel packaging according to the present invention. The rectangular sections 22a", 22b", 22c" of the first row 22" and rectangular section 28a" of the second row 28" are similar to sections 22a, 22b, 22c of the first row and section 28a of the second row, respectively, of the blank 20 of the first embodiment 10. The additional panels 22d" of the first row and 28c" and 28d" of the second row are simply provided in order to define more printing area—e.g., for additional information pertinent to the subject matter of the compact disc or even simply even unrelated advertising. Although end sections 22a" and 22d" of the first row are shown as having adjacent panels 28a" and 28d", respectively, in the second row, clearly any of the intermediate panels in the first row 22" (e.g., 22c") may also or alternatively be provided with adjacent sections in the second row 28" (e.g., 28c"), as illustrated, preferably excepting the section on which the holder is disposed. The holder is preferably disposed on intermediate section 22b" (adjacent to end panel 22a" which receives the end cap) but may be alternatively disposed. The width of each strip 24" is, of course, appropriately adjusted to facilitate movement of the plurality of panels to the collapsed orientation.

To summarize, the present invention provides packaging for a compact disc or the like which includes means for maintaining the packaging in the collapsed orientation, and means to prevent dog-earing, fraying or like destruction of the spines and the exposed sidewall edges of the paperboard panels. The package is ecologically sound, since it may be composed substantially of recycled and/or recyclable plastic and paperboard, as well as being simple and economical to manufacture.

Now that the preferred embodiments of the present invention have been shown and described in detail, various modification sand improvements thereon will become readily apparent to those skilled in the art. Accordingly, the spirit and scope of the present invention is to be construed broadly and limited only by the appended claims, and not by the foregoing specification.

We claim:

1. A storage package for a recording medium comprising:
   (A) a plurality of non-plastic panels including a pair of end panels, said plurality of panels being movable between an open orientation enabling access to the contents of the package and a collapsed orientation for storage purposes, each of said panels having a pair of opposed lateral sidewalls, said plurality of panels in said collapsed orientation defining at least one spine;
   (B) a holder formed of plastic disposed on one of said panels for receiving and maintaining a recording medium thereon; and
   (C) an end cap formed of plastic fixedly secured to one end panel, said end cap including means for releasably cooperatively engaging said holder when said plurality of panels is in said collapsed orientation, thereby to preclude accidental movement of said plurality of panels out of said collapsed orientation.

2. The package of claim 1 wherein said plurality of panels is formed of paperboard.

3. The package of claim 1 wherein said holder is fixedly secured to a panel adjacent said one end panel on which said end cap is disposed.

4. The package of claim 1 wherein said plurality of panels includes at least one intermediate panel, said holder is disposed on one intermediate panel which is immediately adjacent said one end panel, and, when said plurality of panels is in said collapsed orientation, said other of said end panel and any other intermediate panels are disposed intermediate said one end panel and said one intermediate panel.

5. The package of claim 1 wherein said plurality of panels in said open orientation has no panel overlying said panel on which said holder is disposed, thereby enabling access to said holder and any recording medium thereon, and in said collapsed orientation has each of said panels overlapping one another, thereby to provide a compact package for storage.

6. The package of claim 1 wherein said plurality of non-plastic panels additionally includes at least one panel intermediate to and connecting said pair of end panels.

7. The package of claim 1 wherein said end cap automatically interlocks with said holder when said plurality of panels is in said collapsed orientation.

8. A storage package for a recording medium comprising
   (A) a plurality of non-plastic panels including a pair of end panels, said plurality of panels being movable between an open orientation enabling access to the contents of the package and a collapsed orientation for storage purposes, each of said panels having a pair of opposed lateral sidewalls, said plurality of panels in said collapsed orientation defining at least one spine;
   (B) a holder formed of plastic disposed on one of said panels for receiving and maintaining a recording medium thereon, said holder having a generally planar and generally rectangular holder body and a pair of opposed lateral holder sidewalls defining holder engaging means; and
   (C) an end cap formed of plastic fixedly disposed on one of said end panels, said end cap being adapted to releasably engage said holder when said plurality of panels is in said collapsed orientation, thereby to preclude accidental movement of said plurality of panels out of said collapsed orientation, said end cap being generally U-shaped and having a pair of upstanding opposed lateral sidewalls defining end cap engaging means and an end cap bight portion connecting the same, said holder engaging means and said end cap engaging means being adapted to engage cooperatively.

9. The package of claim 8, wherein, when said plurality of panels is in said collapsed orientation, said end cap bight portion extends over one spine of said package to protect the same.

10. The package of claim 9, wherein said end cap bight portion extending over said spine is transparent to enabling viewing of any material on said one spine.

11. The package of claim 8 wherein said holder sidewalls extend upwardly above the plane of said holder body for a major length thereof, said holder engaging means being disposed on the remainder of the length thereof.

12. The package of claim 8 wherein said holder sidewalls extend downwardly below the plane of said holder body for substantially the entire length thereof.

13. The package of claim 8 wherein said holder sidewalls extend downwardly below the plane of said holder body at least the thickness of said panel on which said holder is disposed and, for a major length thereof, upwardly from the plane of said holder body at least the thickness of the remainder of said panels when said plurality of panels is in said collapsed orientation, thereby to overlap and protect the sidewalls of said plurality of panels in said collapsed orientation.

14. The package of claim 8 wherein said holder extend upwardly and downwardly relative to the plane of said holder body to cover both said sidewalls of said panel on which it is disposed and, in cooperation with said sidewalls of said end cap, said sidewalls of the other of said panels when said plurality of panels is in said collapsed orientation.

15. The package of claim 8 wherein said end cap extends upwardly from said panel on which it is disposed to overlap said holder when said plurality of panels is in said collapsed orientation.

16. The package of claim 15 wherein said end cap also extends downwardly from said panel on which it is disposed sufficiently to overlap and protect adjacent edges thereof.

17. The package of claim 8 wherein said end cap extends upwardly and downwardly sufficiently to overlap and protect adjacent portions of the opposed lateral sidewalls and one end of said plurality of panels when said plurality of panels is in said collapsed orientation.

18. The package of claim 8 wherein, when said plurality of panels is in said open orientation, said holder sidewalls extend toward said one end panel on which said end cap is disposed sufficiently beyond said holder body that, when said plurality of panels is in said collapsed orientation, said holder sidewalls overlap and protect the sidewalls of said panels at the spine not covered by said end cap.

19. The package of claim 8 wherein each of said holder and said end cap defines abutment means adapted to abut one another and limit relative movement in a given direction, thereby to limit the pressure exertable by said end cap on said holder body.

20. The package of claim 19 wherein said abutment means are on said sidewalls of said holder and said end cap.

21. A storage package for a compact disc comprising:
(A) a plurality of paperboard panels including a pair of end panels and at least one panel intermediate to and connecting said pair of end panels, said plurality of panels being movable between an open orientation enabling access to the contents of the package and a collapsed orientation for storage purposes, each of said panels having a pair of opposed lateral sidewalls, said plurality of panels in said collapsed orientation defining at least one spine;
(B) a holder formed of plastic and disposed on a panel adjacent one of sad end panels for receiving and maintaining a compact disc thereon, said holder having a generally planar and generally rectangular holder body and a pair of opposed lateral holder sidewalls defining engaging means; said holder sidewalls extending downwardly below the plane of said holder body at least the thickness of said panel on which said holder is disposed and, for the major length thereof, upwardly from the plane of said holder body at least the thickness of the remainder of said panels when said plurality of panels is in the collapsed orientation, thereby to overlap and protect the sidewalls of said plurality of panels in the collapsed orientation; and
(C) an end cap formed of plastic disposed on said one end panel, said end cap being generally U-shaped and having a pair of upstanding opposed lateral sidewalls defining engaging means adapted to engage cooperatively with said holder engaging means and a transparent bight portion connection said end cap engaging means, said end cap extending upwardly and downwardly sufficiently to overlap and protect adjacent portions of the opposed lateral sidewalls and one end of said plurality of panel when said plurality of panels is in said collapsed orientation; said end cap being adapted to releasably engage said holder when said plurality of panels is in said collapsed orientation, thereby to preclude accidental movement of said plurality of panels out of said collapsed orientation, said end cap bight portion extending over one spine of said package to overlap and protect the same when said plurality of panels is in said collapsed orientation while enabling viewing of any material on said one spine, sad holder sidewalls overlapping and protecting the sidewalls of said panels at the spine not covered by said end cap when said plurality of panels is in said collapsed orientation;
said plurality of panels in said open orientation having no panel overlying said panel on which said holder is disposed, thereby enabling access to said holder and any compact disc thereon, and in said collapsed orientation having each of said panels overlapping one another, thereby to provide a compact package for storage.

22. The package of claim 21 wherein said plurality of panels includes at least one intermediate panel, said holder is disposed on one of said at least one intermediate panels which is immediately adjacent said one end panel, and, when said plurality of panels is in said closed orientation, said other of said end panels and any other of said at least one intermediate panels are disposed intermediate said one end panel and said one intermediate panel.

23. The package of claim 21 wherein each of said holder and said end cap defines abutment means on said sidewalls thereof adapted to abut one another and limit relative movement in a given direction, thereby to limit the pressure exerted by said end cap on said holder body.

* * * * *